(12) United States Patent
Egedal et al.

(10) Patent No.: US 11,767,822 B2
(45) Date of Patent: Sep. 26, 2023

(54) WIND TURBINE BLADE FLOW REGULATION

(71) Applicant: Siemens Gamesa Renewable Energy A/S, Brande (DK)

(72) Inventors: Per Egedal, Herning (DK); Peder Bay Enevoldsen, Vejle (DK); Moritz Fiedel, Hamburg (DE); Alejandro Gomez Gonzalez, Aarhus (DK); Gustav Hoegh, Vejle (DK); Mikkel Aggersbjerg Kristensen, Herning (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 17/297,141

(22) PCT Filed: Oct. 31, 2019

(86) PCT No.: PCT/EP2019/079826
§ 371 (c)(1),
(2) Date: May 26, 2021

(87) PCT Pub. No.: WO2020/120013
PCT Pub. Date: Jun. 18, 2020

(65) Prior Publication Data
US 2022/0018336 A1 Jan. 20, 2022

(30) Foreign Application Priority Data

Dec. 13, 2018 (EP) ..................... 18212391

(51) Int. Cl.
*F03D 17/00* (2016.01)
(52) U.S. Cl.
CPC ...... *F03D 17/00* (2016.05); *F05B 2240/3052* (2020.08); *F05B 2260/80* (2013.01); *F05B 2270/327* (2013.01); *F05B 2270/335* (2013.01)

(58) Field of Classification Search
CPC .............. F03D 17/00; F05B 2240/3052; F05B 2260/80; F05B 2270/327; F05B 2270/335;
(Continued)

(56) References Cited

U.S. PATENT DOCUMENTS 4,692,095 A 9/1987 Lawson-Tancred
5,106,265 A 4/1992 Holzem
(Continued)

FOREIGN PATENT DOCUMENTS

DE 10 2011 116961 A1 5/2013
EP 1320680 A1 6/2003
(Continued)

OTHER PUBLICATIONS

European Search Report and Written Opinion of the European Searching Authority dated Jul. 17, 2019 for Application No. 18212391.9.
(Continued)

*Primary Examiner* — Joseph Ortega
(74) *Attorney, Agent, or Firm* — Schmeiser, Olsen & Watts LLP

(57) ABSTRACT

Provided is a method for detecting the operative status of an aerodynamic device for influencing the airflow which flows from the leading edge of a rotor blade for a wind turbine to the trailing edge of the rotor blade, the aerodynamic device being movable by an actuator between a first protruded configuration and a second retracted configuration. The method includes the steps of measuring a temporal course of an operational value of the wind turbine, comparing the measured temporal course of the operational value with a desired temporal course of an operational value, and deriving an operative status of the aerodynamic device.

8 Claims, 4 Drawing Sheets

(58) Field of Classification Search
CPC . F05B 2270/32; F05B 2270/331; Y02E 10/72
See application file for complete search history.

(56) References Cited

U.S. PATENT DOCUMENTS

| | | | |
|---|---|---|---|
| 8,851,840 B2 | 10/2014 | Hancock et al. | |
| 2007/0003403 A1* | 1/2007 | Pedersen | F03D 7/043 |
| | | | 415/4.1 |
| 2015/0000404 A1 | 1/2015 | Brenner et al. | |
| 2019/0072072 A1* | 3/2019 | Fang | F03D 7/044 |

FOREIGN PATENT DOCUMENTS

| | | |
|---|---|---|
| EP | 1 623 111 B1 | 9/2008 |
| EP | 3290688 A1 | 3/2018 |
| EP | 3577338 A1 | 12/2019 |
| EP | 3577339 A1 | 12/2019 |
| WO | WO0229247 A1 | 4/2002 |
| WO | WO 2010023278 A2 | 3/2010 |
| WO | 2018/041420 A1 | 3/2018 |
| WO | WO2018162100 A1 | 9/2018 |
| WO | WO2018162102 A1 | 9/2018 |

OTHER PUBLICATIONS

International Search Report and Written Opinion for PCT/EP2019/079826 dated Jan. 17, 2020.

\* cited by examiner

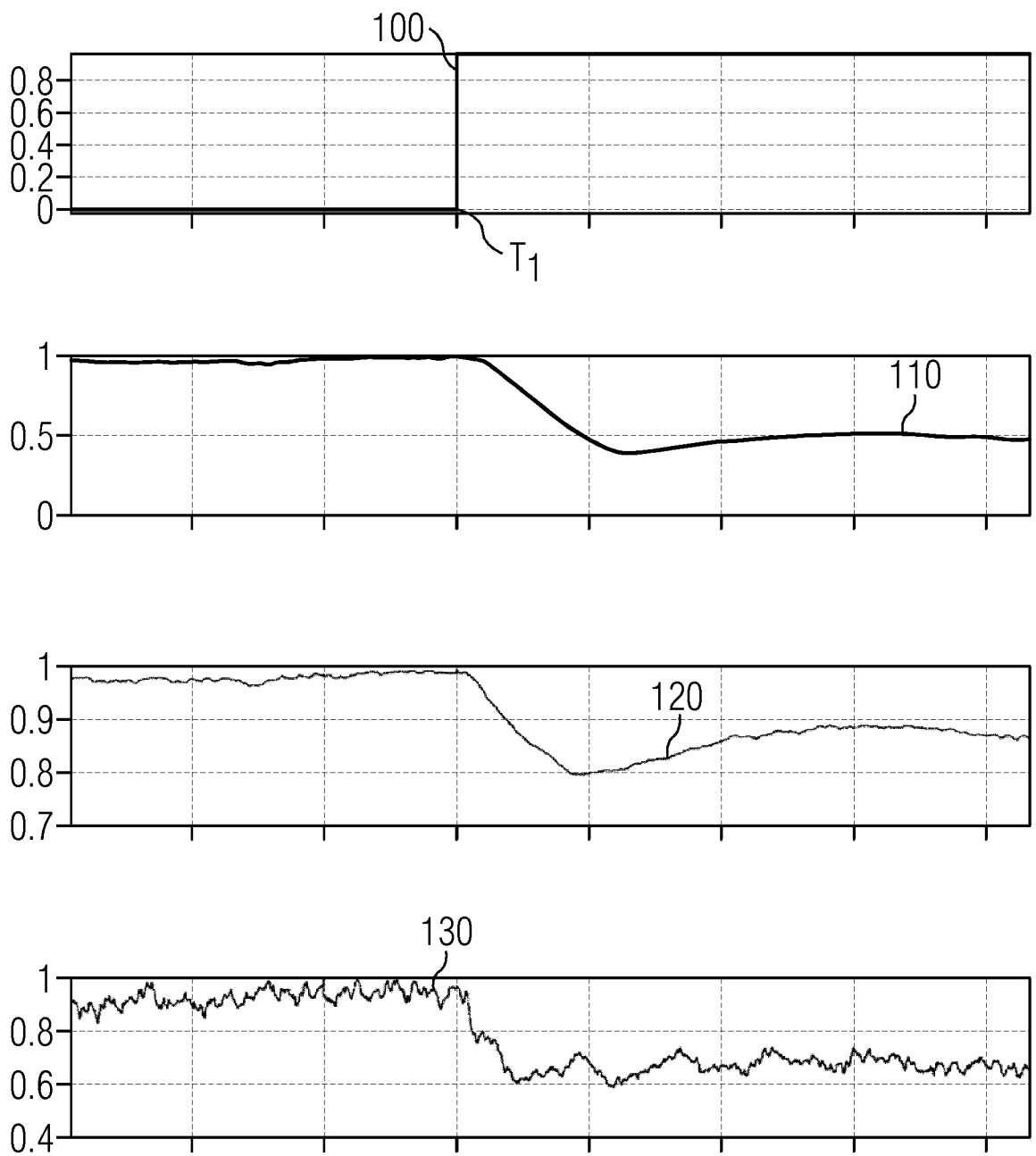

ial value of
WIND TURBINE BLADE FLOW REGULATION

CROSS-REFERENCE TO RELATED APPLICATIONS

This application claims priority to PCT Application No. PCT/EP2019/079826, having a filing date of Oct. 31, 2019, which is based on EP Application No. 18212391.9, having a filing date of Dec. 13, 2018, the entire contents both of which are hereby incorporated by reference.

FIELD OF TECHNOLOGY

The following relates to a method for detecting the status in an aerodynamic device for regulating the flow on the surface of a blade for a wind turbine.

BACKGROUND

A wind turbine rotor blade may have installed a flow regulating device on its surface, which flows from the leading edge to the trailing edge of a rotor blade of a wind turbine. An example of such a flow regulating device is a vortex generator (VG) installed on the suction side of the wind turbine rotor blade. In general, a flow regulating device may be considered to comprise a device which is capable of enhancing the lift coefficient of the aerofoil section, for example by increasing the level of energy of the boundary layer of the rotor blade.

Other aerodynamic devices may act in concert with the vortex generator and may influence the effect of the vortex generator depending on the state of the spoiler. Examples of the latter aerodynamic device are typically spoilers, installed on the suction side of the blade, between the trailing edge and the vortex generator. Alternatively, spoilers may be present alone, i.e. not combined with vortex generators or other flow regulating devices. Spoilers may be configured such that its shape and/or orientation can be regulated, e.g. by a pneumatic or hydraulic or mechanical actuator.

The spoiler may act in concert with the vortex generator and may influence the effect of the vortex generator depending on the state of the spoiler, i.e. a protrusion height and/or tilt angle by which the spoiler extends from or is tilted relative to other surface portions of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine wing comprising a pneumatically actuated spoiler movable perpendicular to an airstream.

WO 2018/041420 disclose a rotor blade comprising an aerodynamic device for influencing the airflow flowing from the leading edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

It is desirable to monitor the performance of the spoilers or other flow regulating aerodynamic devices regulated by a pneumatic or hydraulic actuator and their influence on the wind turbine power production. In particular, there may be a need to identify when a flow regulating aerodynamic device of such type is faulty.

SUMMARY

An aspect relates to a method for detecting the operative status of an aerodynamic device for influencing the airflow flowing from the leading edge of a rotor blade for a wind turbine to the trailing edge of the rotor blade, the aerodynamic device being movable by an actuator between a first protruded configuration and a second retracted configuration. The method comprises the steps of:

measuring a temporal course of an operational value of the wind turbine, comparing the measured temporal course of the operational value with a desired temporal course of an operational value, deriving an operative status of the aerodynamic device.

According to embodiments of the present invention, the measuring and comparing steps are performed during activation or deactivation of the actuator of the aerodynamic device. Embodiments of the present invention permit to observe the transients of the aerodynamic devices to monitor them, so that failures are identified and consequently can be mitigated. Existing sensors in the turbine can be used making the detection method cost effective.

The monitoring may be performed continuously or periodically. In the latter case, the monitoring may be performed according for example to a predefined schedule.

According to embodiments of the invention, the operational value is any of:

a power output of the wind turbine, a rotational speed of a rotor and/or electrical generator of the wind turbine, a thrust on a rotor of the wind turbine, a strain in a tower or foundation or blade or nacelle or hub of the wind turbine, a pitch torque on a blade of the wind turbine, a load on a blade of the wind turbine, an acceleration of a nacelle and/or tower and/or rotor blade and/or hub of the wind turbine, a wind speed at the nacelle of the wind turbine.

Any other signal, whose value is influenced by the presence and/or activation and/or deactivation of an aerodynamic device may be used.

According to embodiments of the invention, the desired temporal course of an operational value is registered during a non-faulty time interval of the aerodynamic device.

Alternatively, the desired temporal course of an operational value is calculated.

According to embodiments of the invention, comparing the measured temporal course of the operational value with a desired temporal course of an operational value comprises calculating a difference between the measured temporal course of the operational value and the desired temporal course.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 5 shows temporal course of operational values of the wind turbine of FIG. 1, to which the method of embodiments of the present invention is applied.

DETAILED DESCRIPTION

Figure 1:
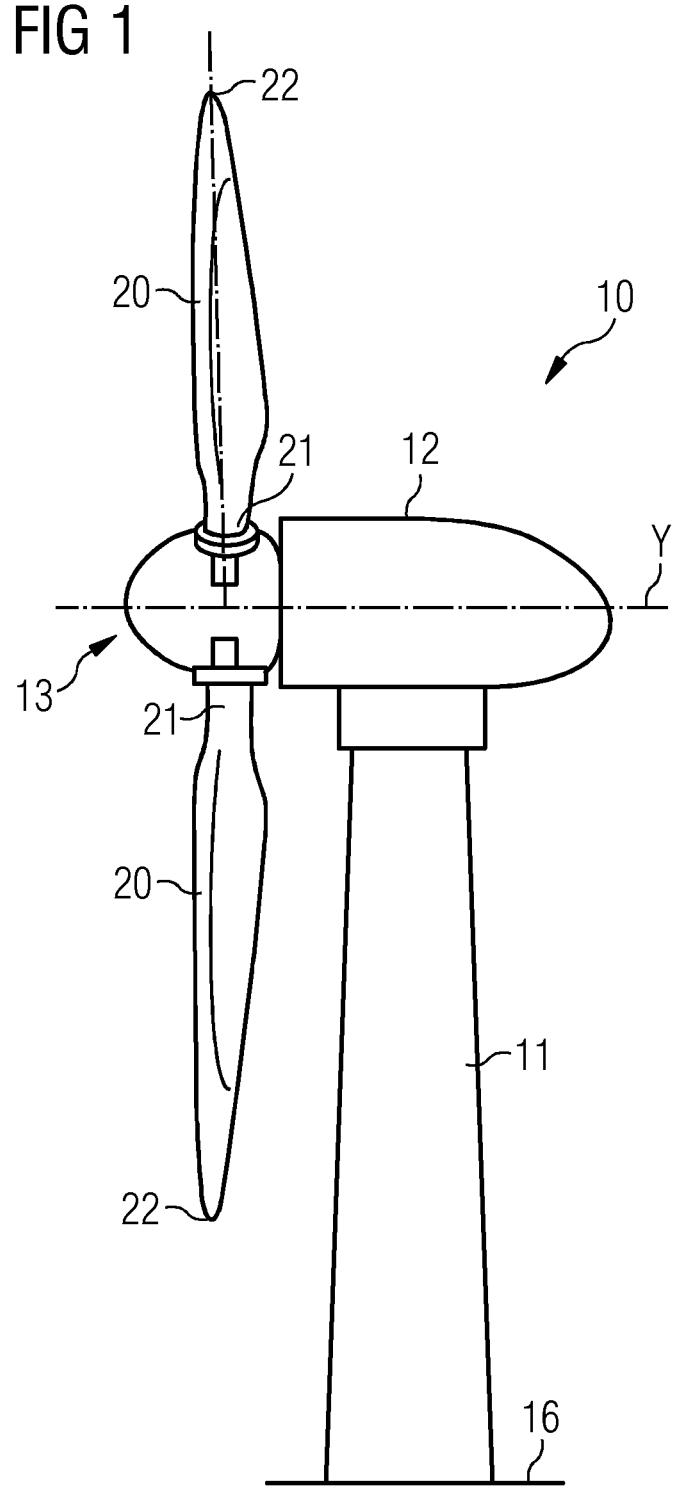
FIG. 1 shows a wind turbine.

FIG. 1 shows a conventional wind turbine 10 for generating electricity. The wind turbine 10 comprises a tower 11 which is mounted on the ground 16 at one end. At the opposite end of the tower 11 there is mounted a nacelle 12. The nacelle 12 is usually mounted rotatable with regard to the tower 11, which is referred to as comprising a yaw axis substantially perpendicular to the ground 16. The nacelle 12 usually accommodates the generator of the wind turbine and the gear box (if the wind turbine is a geared wind turbine). Furthermore, the wind turbine 10 comprises a hub 13 which is rotatable about a rotor axis Y. When not differently specified, the terms axial, radial and circumferential in the following are made with reference to the rotor axis Y. The hub 13 is often described as being a part of a wind turbine rotor, wherein the wind turbine rotor is capable to rotate about the rotor axis Y and to transfer the rotational energy to an electrical generator (not shown).

The wind turbine 1 further comprises at least one blade 20 (in the embodiment of FIG. 1, the wind rotor comprises three blades 20, of which only two blades 20 are visible) mounted on the hub 13. The blades 4 extend substantially radially with respect to the rotational axis Y. Each rotor blade 20 is usually mounted pivotable to the hub 13, in order to be pitched about respective pitch axes X. This improves the control of the wind turbine and in particular of the rotor blades by the possibility of modifying the direction at which the wind is hitting the rotor blades 20. Each rotor blade 20 is mounted to the hub 13 at its root section 21. The root section 21 is opposed to the tip section 22 of the rotor blade.

Figure 2:
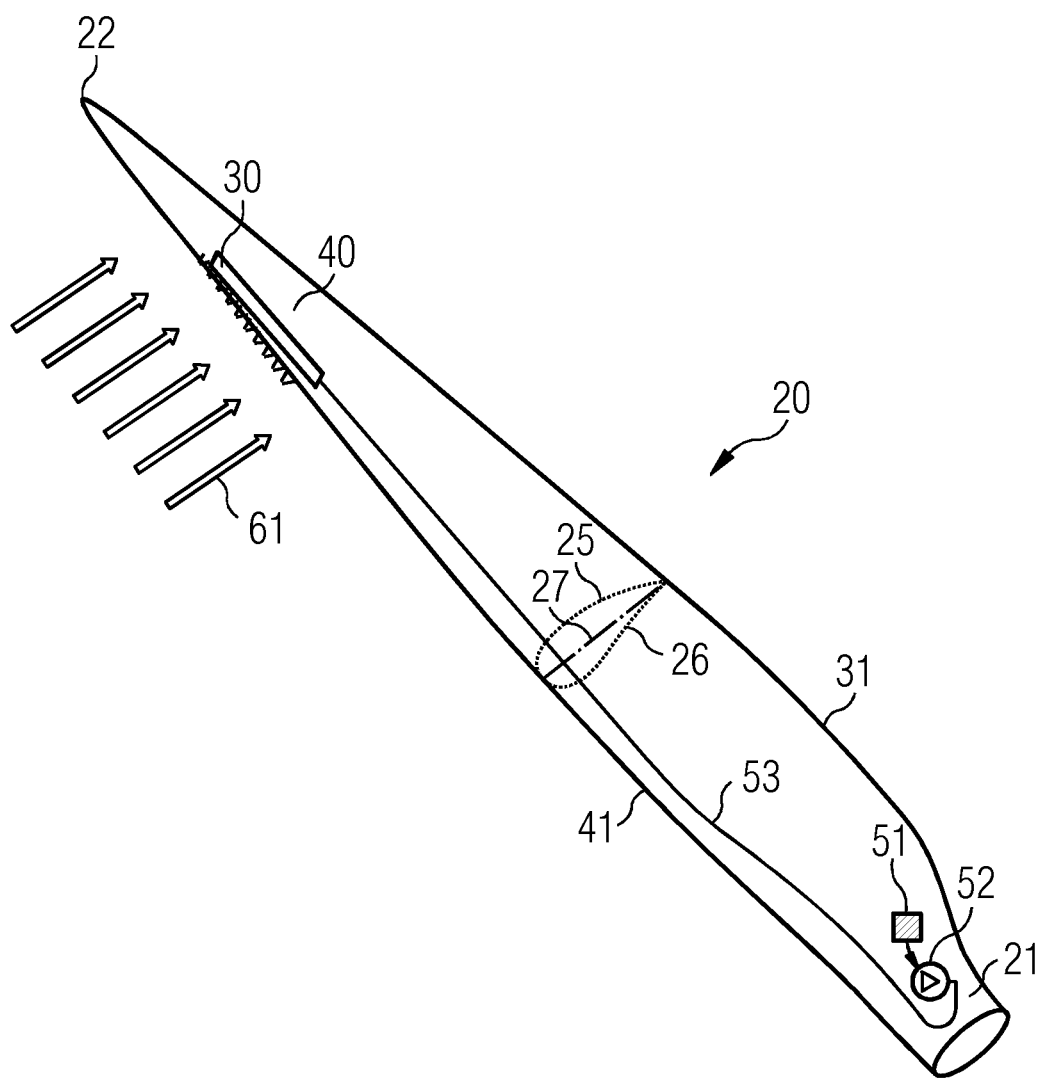
FIG. 2 shows a rotor blade of a wind turbine with an aerodynamic device.

FIG. 2 illustrates the rotor blade 20 comprising an aerodynamic device 30 in the form of an actuated spoiler. Between the root section 21 and the tip section 22 the rotor blade 20 furthermore comprises a plurality of aerofoil sections for generating lift. Each aerofoil section comprises a suction side 25 and a pressure side 26. The aerofoil shape of the aerofoil portion is symbolized by one aerofoil profile which is shown in FIG. 2 and which illustrates the cross-sectional shape of the rotor blade at this spanwise position. Also note that the suction side 25 is divided or separated from the pressure side 26 by a chord line 27 which connects a leading edge 41 with a trailing edge 31 of the rotor blade 20.

The aerodynamic device 30 is arranged on the suction side 25 between the leading edge 41 and the trailing edge 31.

The aerodynamic device 30 in FIG. 2 is movable by a pneumatic actuator, for example an inflatable cavity operated by a pressure line 53, or by an hydraulic actuator or by a mechanical actuator.

The pressure line 53 is comprised in a pressure supply system 52 and controlled by a control unit 51. The pressure supply system 52 provides a pressurized fluid, for example pressurized air or other pressurized gasses. In this context, the term "pressurized fluid" not only implies positive pressure but also negative pressure, wherein fluid is sucked (or "drawn") out of the pressure hose of the aerodynamic device 30. The pressure line 53 could be in practice realized as tubes or pipes which do not significantly change their volume. Finally, the control unit 51 is responsible for setting a specific pressure at the pressure supply system 52 which subsequently leads to a certain predetermined pressure at the aerodynamic device 30.

In the example shown in FIG. 2, the control unit 51 and the pressure supply system 52 are located in the root section 21 of the rotor blade 20. According to other embodiments of the present invention (not shown in the attached figures), these parts could also be placed elsewhere in the wind turbine, such as e.g. in the hub 13 of the wind turbine 10.

The rotor blade 20 additionally comprises a flow regulating unit 40 comprising multiple pairs of vortex generators.

The flow regulating unit 40 are arranged on the suction side 25 of the blade 20 between the aerodynamic device 30 and the trailing edge 31.

According to other embodiments of the present invention (not shown in the attached figures), the flow regulating unit 40 are arranged on the suction side 25 of the blade 20 between the leading edge 41 and the aerodynamic device 30.

According to other embodiments of the present invention (not shown in the attached figures), the flow regulating unit 40 are not present and only the aerodynamic device 30 is used to regulate the flow on the surface of the blade 20.

According to other embodiments of the present invention (not shown in the attached figures), the blade 20 comprises a plurality of aerodynamic devices 30.

Figure 3:
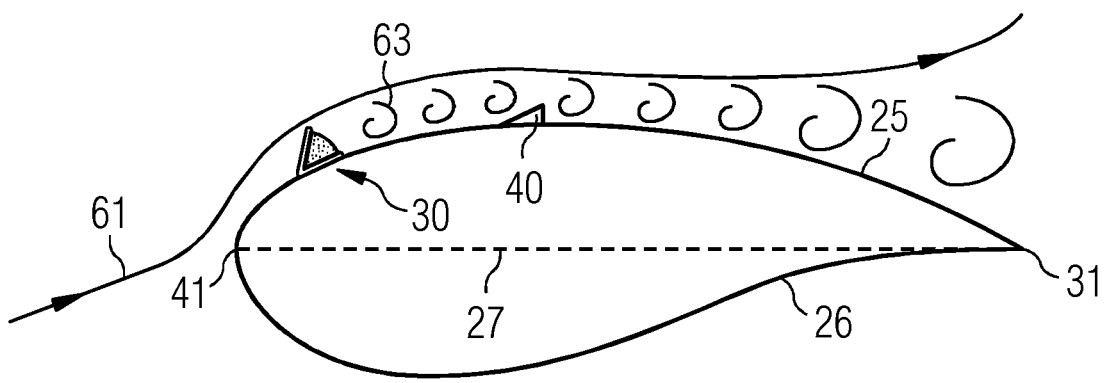
FIG. 3 shows a radial section of the rotor blade of FIG. 2.

FIG. 3 shows the aerodynamic device 30 in a first protruded configuration.

In the first configuration the aerodynamic device 30 deviates the airflow 61 which is flowing from the leading edge 41 to the trailing edge 31 of the rotor blade.

The aerodynamic device 30 in the first protruded configuration induces stall. This is visualized with relatively large vortices 63 downstream of the aerodynamic device 30. A consequence of the induced stall is a decrease in lift of the rotor blade and, consequently, a reduced loading of the rotor blade and related components of the wind turbine.

Figure 4:
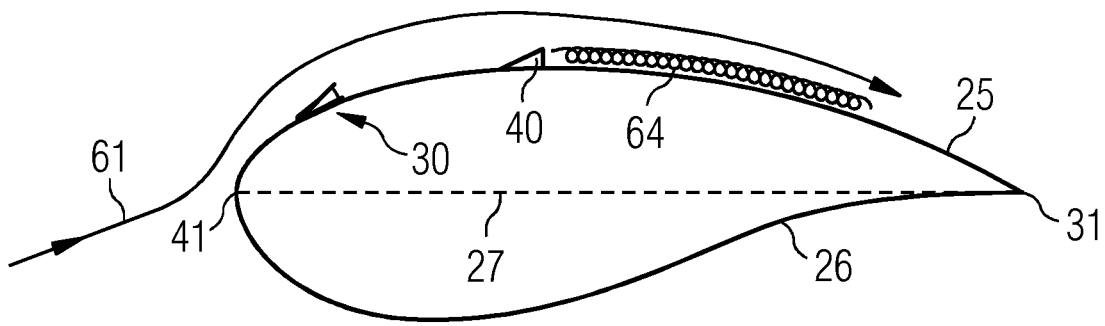
FIG. 4 shows a radial section of the rotor blade of FIG. 2.

FIG. 4 shows the aerodynamic device 30 in a second retracted configuration, i.e. moved downwards towards the surface of the rotor blade 20.

In this second configuration, the airflow 61 flowing across the aerodynamic device 30 remains attached to the surface of the rotor blade 20, thus that no flow separation, i.e. stall, occurs. As a consequence, the lift of the rotor blade increases. Re-energizing vortices 64 are generated in the boundary layer by the vortex generators 40, which have the effect of helping increasing the lift.

As a result, the highest lift values can be achieved.

By operating the actuator, i.e. the pressure line 53, of the aerodynamic device 30, the aerodynamic device 30 can be moved between the first protruded configuration and the second retracted configuration in order to vary the aerodynamic properties of the blade as desired and requested when operating the wind turbine 10.

FIG. 5 the plot shows an activation signal 100 for the aerodynamic device 30, which is being activated in the first protruded configuration at an activation time Ti. The plots 110, 120, 130 show a desired normalized temporal course of three operational values of the wind turbine 10, namely the turbine power production 110, the rotor speed 120 and the rotor thrust 130, respectively. The desired temporal courses of the operational values are registered during a non-faulty time interval of the aerodynamic device 30. Alternatively, the desired temporal courses of the operational values are calculated offline, for example according to theoretical models.

The desired normalized temporal courses 110, 120, 130 may be therefore defined as expected values, when the aerodynamic device 30 is working correctly, without faults.

According to embodiments of the present invention the actual temporal courses of at least one of the desired operational values 110, 120, 130 of the wind turbine 10 are measured when activating or deactivating of the actuator of the aerodynamic device 30.

The measured temporal courses are compared with the desired temporal courses of the operational values to derive an operative status of the aerodynamic device 30.

According to embodiments of the present invention, the comparison involves calculating a difference between the measured temporal courses and the desired temporal courses.

According to other embodiments of the present invention, the deviation between the measured temporal courses and the desired temporal courses involves the calculation of typical error function, e.g. the simple moving average error function or the mean squared error function or the exponential error function.

When the deviation between measured and desired operational values is excessive a faulty condition of the aerodynamic device 30 is identified and remedies can be taken, for example a maintenance intervention may be scheduled.

According to embodiments of the present invention, a plurality of operational values may be used in addition or instead of the above mentioned turbine power production 110, the rotor speed 120 and the rotor thrust 130, for example:
- a strain in the wind turbine 10, e.g. in the tower 11 or in the foundation or in a blade 20 or in the nacelle 12,
- a pitch torque on a blade 20,
- a load on a blade 20 or other component of the wind turbine 10,
- an acceleration of the nacelle 12,
- a wind speed at the nacelle 12.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for detecting an operative status of an aerodynamic device for influencing an airflow flowing from a leading edge of a rotor blade for a wind turbine to a trailing edge of the rotor blade, the aerodynamic device being movable by an actuator between a first protruded configuration and a second retracted configuration, wherein the wind turbine includes at least one sensor and a control unit, the method comprising:
   activating the actuator to move the aerodynamic device to the first protruded configuration to induce stall;
   measuring a temporal course of an operational value of the wind turbine, in response to the activating;
   comparing the temporal course of the operational value with a desired temporal course of the operational value; and
   identifying a faulty condition of the aerodynamic device based on a deviation between the temporal course of the operational value and the desired course of the operational value.

2. The method according to the claim 1, wherein the operational value is any of:
   a power output of the wind turbine,
   a rotational speed of a rotor and/or electrical generator of the wind turbine,
   a thrust on a rotor of the wind turbine,
   a strain in a tower or foundation or blade or nacelle or hub of the wind turbine,
   a pitch torque on a blade of the wind turbine,
   a load on a blade of the wind turbine,
   an acceleration of the nacelle and/or the tower and/or the rotor blade and/or the hub of the wind turbine, and
   a wind speed at the nacelle of the wind turbine.

3. The method according to claim 1, wherein the desired temporal course of the operational value is registered during a non-faulty time interval of the aerodynamic device.

4. The method according to claim 1, wherein the desired temporal course of the operational value is calculated.

5. The method according to claim 1, wherein comparing the temporal course of the operational value with the desired temporal course of the operational value comprises calculating a difference between the temporal course of the operational value and the desired temporal course.

6. The method according to claim 1, wherein the measuring the temporal course of the operational value of the wind turbine is performed continuously.

7. The method according to claim 1, wherein the measuring the temporal course of the operational value of the wind turbine is performed periodically.

8. The method according to claim 1, wherein, in response to the identifying the faulty condition, remedying the faulty condition by scheduling a maintenance of the aerodynamic device.

* * * * *